United States Patent Office 2,921,002
Patented Jan. 12, 1960

2,921,002
PREPARATION OF GLUTAMIC ACID BY ASPERGILLUS TERREUS

Donald A. Kita, Jackson Heights, N.Y., assignor to Chas. Pfizer & Co., Inc., New York, N.Y., a corporation of Delaware No Drawing. Application July 17, 1956
Serial No. 598,260

3 Claims. (Cl. 195—35)

This invention is concerned with a method for the preparation of glutamic acid by fermentation. In particular, it is concerned with a method for the preparation of glutamic acid by cultivation under submerged aerobic conditions of certain strains of microorganisms.

The strains of microorganisms to which we refer are those of the species Aspergillus terreus. This is a known species of organism, cultures of which are available in public culture collections and which may be isolated by known methods from natural materials such as soil and water and identified by published descriptions. The present invention consists of fermentation, that is, growth of the microorganism in a nutrient medium under aerobic conditions using a strain of Aspergillus terreus. In conducting the present process, the microorganism may be maintained on nutrient agar slants or on other suitable media known to skilled mycologists. Spores of the organism or the whole growth may be transferred from such slants to suitable nutrient media for growth of the organism in flasks. A suitable period of growth in flasks is from about 24 to about 90 hours. The material thus produced may be used for the recovery of the product or for inoculation of media contained in larger vessels equipped for submerged aerobic fermentation. These may be used for producing larger quantities of product.

The media used for conducting the present fermentation process may be varied considerably. It is essential that a source of nitrogen be included. This may be an inorganic nitrogen source or an organic source or a combination of these. Useful materials include amino acids, proteins, ammonium salts, nitrates, urea, and so forth. These, of course, should not be toxic to the organism that is used. In general, it is also advisable to include a source of carbohydrate, a source of minerals (which may be present in sufficient quantity in other crude materials), and a source of growth stimulants. The process is operated at a pH of approximately neutrality, that is, from about 5.5 to 8.0. If materials are used as nutrients in the fermentation medium which tend to change the pH, it may be necessary to use buffering materials or adjust the pH during the fermentation. In general, the process is completed within from about 48 to about 90 hours. A temperature of approximately 25° to 32° C. is used. Thereafter the product may be harvested. It has been noted that the addition of certain high concentration nitrogen sources at the beginning or during the fermentation is particularly effective in stimulating the production of high yields of glutamic acid. For instance, urea may be used most effectively in this manner. Ammonia and ammonium salts, such as the sulfate or nitrate, are also quite useful although not as effective as urea. Other nitrogen sources may be used but are somewhat less effective. Care must be exercised in maintaining a suitable pH when ammonia or the ammonium salts are used as nitrogen sources. Mixtures of two or more of these materials may also be used.

In conducting the present process a source of growth stimulating materials may be used at a concentration of from about 1 to about 6%. Materials such as distiller's solubles, yeast extract, and other substances of this nature well known to fermentation experts are particularly effective in this respect. A source of organic nitrogen is used in addition to the above sources of growth stimulants. The organic nitrogen source may be utilized from the extent of from about 2 to about 6%. Particularly effective for this purpose is corn gluten meal. Soybean mean, peanut meal or cottonseed meal may also be utilized although these are not as effective as the first-named material. Finally, the medium should contain a source of carbohydrate. This may be in the form of starch, glucose, sucrose or other sugars or sugar syrups. It has been found that glucose is particularly effective. The carbohydrate source may be utilized to the extent of from about 3 to about 10%. Certain organic nitrogen sources (e.g. corn gluten meal) may also furnish considerable carbohydrate.

After the fermentation medium is prepared it may be adjusted to a pH of from approximately 5.5 to about 8.0 as indicated above. The adjustment may be made with alkali such as sodium or potassium hydroxide or carbonates, if the mixture is acid. Thereafter the medium is sterilized and inoculated under sterile conditions with a selected strain of Aspergillus terreus. A variety of strains of this organism have been tested and found to be effective in producing glutamic acid in appreciable yields under the conditions described herein. It is relatively easy to select strains of this organism from soil samples or culture collections using the known characteristics of the organism. By running the fermentation under the conditions described herein the strains may be evaluated. In general, it is desirable to select a strain producing at least about 5 grams of product per liter of whole broth. Some of the strains which are useful in the process of this invention and are available at public culture collections are listed below.

| Public Culture Collection Number | Pfizer Culture Collection Number |
|---|---|
| QM 1013 | 3465 |
| QM 441 | 3470 |
| QM 151A | 3468 |
| QM 449 | 3466 |
| ATCC 1012 | 1109 |
| NRRL 32A S16 | 1110 |
| NRRL 32E S1-4 | 1112 |

QM is a symbol for the culture collection of the Quartermaster Corps Depot at Philadelphia, Pennsylvania. ATCC is the designation for the American Type Culture Collection at Washington, D.C. NRRL is the designation for the culture collection of the Northern Regional Research Laboratory of the Department of Agriculture at Peoria, Illinois.

The medium is agitated and aerated under sterile conditions for a period of from about 48 to about 90 hours. As noted above it may be desirable to add either at the beginning or during the fermentation a concentrated source of nitrogen such as ammonia, an ammonium salt, or urea. This may be added to the extent of from about 0.1 to about 1% by weight of the medium and, if it is to be added during the course of the fermentation, this may be accomplished by the addition of portions of the material at intervals or by the addition of the whole amount at one time. It is sometimes found desirable to add this nitrogen source or others after initial growth of the organism has been established, for instance, after about 20 to 30 hours.

The present process is most effective in the production of glutamic acid but is also effective in producing certain other additional amino acids which are of considerable importance in nutrition and therapy. These compounds include tryptophane, lysine, and other valuable amino acids. The glutamic acid formed is predominantly or completely in the form of the "natural" compound that is, L(+)-glutamic acid.

The glumatic acid and other materials produced by the present process may be recovered by a variety of methods known in the chemical art. For instance, the mycelium which has been shown to contain a high proportion of glutamic acid probably in combined (polypeptide or protein) form or the whole broth may be treated with an equal volume of a strong acid, preferably a mineral acid such as concentrated hydrochloric acid or 8 to 50% sulfuric acid. After heating for several hours, preferably at 100° C. or more, e.g. in an autoclave under, for instance, 20 p.s.i. pressure, the amino acid which is leached out of the mycelium may be adsorbed on acid washed alumina. This material may be used batchwise or preferably in a column. The alumina may then be eluted with dilute alkali to obtain the glutamic acid in a purified solution form. The solution containing the sodium salts may be dried by conventional methods. Alternatively, the glutamic acid may be recovered by contacting a solution of the acid hydrolyzate of the mycelium with a suitable ion-exchange resin. A further method involves the extraction of the mycelium with hot hydrochloric acid, filtration, then concentration of the hydrochloric acid solution until the solid glutamic acid separates. If anhydrous hydrogen chloride is passed into the highly concentrated solution and the solution is refrigerated, the crystalline hydrochloride separates.

Other methods may be used for recovery of the product. For instance, the sulfuric acid hydrolyzate is filtered and neutralized with lime. The precipitated gypsum is filtered and the solution is contacted with a synthetic cation-exchange resin such as Rohm and Haas Company's Amberlite IR-120 which removes the lysine. The latter may be recovered by elution with dilute acid. By further contact of the solution with an anion-exchange resin, such as Amberlite IR-4B, inorganic salts may be removed. Further contact with the same type resin results in recovery of the glutamic acid which may be removed with dilute alkali. By concentration of the eluate at a suitable pH, monosodium glutamate is separated in solid form. Glutamic acid in the form of calcium glutamate may be isolated by adding lime to the hydrolyzed fermentation product (with preliminary separation of gypsum if sulfuric acid is used for hydrolysis) and then adding about 10 volumes of methanol to the solution. The product is filtered and dried. It may be converted to the acid or sodium salt.

In general the present fermentation process results in the formation of glutamic acid at a concentration of from about 5 to about 20 grams per liter of the whole fermentation product. As indicated above, the great majority of the glutamic acid is in the mycelium, that is, the solid components of the fermentation broth and must be recovered therefrom by methods such as those described above.

This application is a continuation-in-part of an earlier filed copending application Serial No. 502,507, filed on April 19, 1955, by Donald A. Kita, and now abandoned.

The following examples are given by way of illustration and are not intended as a limitation of the scope of this invention. In fact, as many widely varying embodiments are possible without departing from the spirit and scope of the herein described invention, it is to be understood that this invention is to be limited by the specific wording of the appended claims only.

*Example I*

A fermentation medium was prepared containing 4% of distiller's solubles, 7% by weight of glucose monohydrate and 0.2% by weight of corn steep liquor. This mixture wa dispensed into flasks, utilizing 100 milliliters per 300-milliliter flasks. The medium was adjusted to pH 7 with sodium hydroxide solution, sterilized by autoclaving and then seeded under aseptic conditions with spores from an agar slant of *Aspergillus terreus* QM 441. The mixture was incubated at 28° C. for 48 hours, during which time the flasks were continually agitated in a rotary fashion. This inoculum was utilized to inoculate a fermentation medium prepared from 4% by weight of distiller's solubles, 4% by weight of corn gluten meal, and 7% by weight of glucose hydrate. The medium was adjusted to pH 7 with dilute sodium hydroxide, and autoclaved, before seeding. Approximately 100 milliliters of inoculum was used for two liters of the fermentation medium. The mixture was placed in sterile four-liter metal vessels equipped for agitated, aerated growth of microorganisms under sterile conditions. The fermentation was conducted at 28° C. and, after 24 hours, 0.5% by weight of urea was added to the fermentation mixture under sterile conditions. After a further 48 hours the mixture was filtered. The mycelium was treated with an equal volume of concentrated hydrochloric acid and was autoclaved for six hours. From the aqueous solution that resulted, glutamic acid was recovered in a yield representing approximately 15 grams per liter of the original fermentation product.

*Example II*

A fermentation medium was prepared containing 14% of a commercial grade of molasses known as "crude B," 4% corn gluten meal, 2% distiller's solubles, 2% corn starch, and ½% ammonium sulfate. The mixture was diluted with tap water and adjusted to pH 7 with KOH before sterilization. The medium was then seeded under sterile conditions with a strain of *Aspergillus terreus* ATCC 1012. Fermentation was conducted at a temperature of 27° C. for 24 hours. At that point, 0.5% of urea was added under sterile conditions and the process was continued for a further 48 hours. The whole fermentation broth was found, upon analysis, to contain a total of 15 grams of glutamic acid per liter of fermentation broth. The mycelium was separated and treated at 115° C. under pressure with 12% sulfuric acid. The mixture was filtered and neutralized with lime. The mixture was stirred one-half hour and the gypsum was filtered. The filtrate was passed through a column packed with Amberlite IR-120 resin. The effluent was then passed through a column of Amberlite IR-4B until the ash content was substantially reduced. The solution was then passed through a further Amberlite IR-4B column in which the glutamic acid was adsorbed. The amino acid was eluted from this column with just sufficient dilute sodium hydroxide to remove the compound as the monosodium salt. The solution was concentrated and methanol was added to separate the solid monosodium glutamate which was filtered and dried.

*Example III*

The process of preparing glutamic acid was repeated using *A. terreus* QM 1013 as the organism and the following medium:

| | Percent |
|---|---|
| Distiller's solubles | 4 |
| Corn gluten meal | 4 |
| Glucose monohydrate | 7 |
| Urea | ¹1 |

¹ Added at 24 hrs.

A yield was obtained of 13 grams of glutamic acid per liter of broth.

*Example IV*

The process of preparing glutamic acid was repeated using *A. terreus* QM 151A as the organism and the following medium:

| | Percent |
|---|---|
| Distiller's solubles | 4 |
| Corn gluten meal | 4 |
| Glucose monohydrate | 7 |
| Ammonium sulfate | 1 |

A yield was obtained of 10 grams of glutamic acid per liter of broth.

Example V

The process of preparing glutamic acid was repeated using *A. terreus* ATCC 1012 as the organism and the following medium:

| | Percent |
|---|---|
| Soybean meal | 4 |
| Potassium dihydrogen phosphate | 1 |
| Glucose monohydrate | 7 |
| Urea | [1] 0.5 |

[1] Added at 24 hrs.

A yield was obtained of 12.5 grams of glutamic acid per liter of broth.

Example VI

The process of preparing glutamic acid was repeated using *A. terreus* NRRL 32A S16 as the organism and the following medium:

| | Percent |
|---|---|
| Corn gluten meal | 4 |
| Glucose monohydrate | 7 |
| Urea | [1] 1 |

[1] Added at 24 hrs.

A yield was obtained of 11.5 grams of glutamic acid per liter of broth.

Example VII

The process of preparing glutamic acid was repeated using *A. terreus* NRRL 32E S1-4 as the organism and the following medium:

| | Percent |
|---|---|
| Corn gluten meal | 4 |
| Corn steep liquor | 0.2 |
| Glucose monohydrate | 7 |
| Urea | [1] 1 |

[1] At 24 hrs.

A yield was obtained of 12 grams of glutamic acid per liter of broth.

Example VIII

The process of preparing glutamic acid was repeated using *A. terreus* QM 1013 as the organism and the following medium:

| | Percent |
|---|---|
| Distiller's solubles | 4 |
| Corn gluten meal | 4 |
| Glucose monohydrate | 7 |
| Ammonium hydroxide | [1] 0.5 |

[1] Added at 24 hrs.

A yield was obtained of 8.5 grams of glutamic acid per liter of broth.

Example IX

The process of preparing glutamic acid was repeated using *A. terreus* QM 1013 as the organism and the following medium:

| | Percent |
|---|---|
| Pharma Media | 4 |
| Glucose monohydrate | 7 |
| Urea | [1] 1 |

[1] Added at 24 hrs.

A yield was obtained of 11.5 grams of glutamic acid per liter of broth.

Example X

The process of preparing glutamic acid was repeated using *A. terreus* QM 441 as the organism and the following medium:

| | Percent |
|---|---|
| Distiller's solubles | 2 |
| Corn gluten meal | 4 |
| Oatmeal | 4 |

A yield was obtained of 9.0 grams of glutamic acid per liter of broth.

Example XI

The above process of preparing glutamic acid was repeated using 10% Crude C molasses as the carbohydrate. A yield of 9.0 grams of glutamic acid per liter of broth was obtained.

Example XII

The above process of preparing glutamic acid was repeated using 14% Crude B molasses as the carbohydrate. A yield of 10.0 grams of glutamic acid per liter of broth was obtained.

What is claimed is:

1. A process for the preparation of glutamic acid which comprises cultivating a strain of *Aspergillus terreus* under aerobic conditions in an aqueous nutrient fermentation medium containing a source of available nitrogen and a source of carbohydrate, while maintaining the pH of the medium at from about 5.5 to about 8.0, and adding to the medium after initiation of the fermentation a high concentration nitrogen source.

2. A process as claimed in claim 1 wherein glutamic acid is recovered after subjecting the fermentation mycelium to acid hydrolysis.

3. A process as claimed in claim 1 wherein the subsequently added high concentration nitrogen source is a compound chosen from the group consisting of ammonia, ammonium sulfate, ammonium nitrate and urea.

References Cited in the file of this patent

UNITED STATES PATENTS

| 2,674,561 | Moyer | Apr. 6, 1954 |
| 2,749,279 | Smythe | June 5, 1956 |
| 2,789,939 | Kita | Apr. 23, 1957 |

OTHER REFERENCES

Calam et al.: "Biochem. Journal," vol. 33, 1939, pp. 1488 and 1489.

Thom et al.: "Manual of the Aspergilli," 1945, publ. by The Williams & Wilkins Co. (Baltimore), pp. 204 and 205.